US012767610B2

(12) United States Patent
Keulen et al.

(10) Patent No.: US 12,767,610 B2
(45) Date of Patent: Oct. 20, 2026

(54) CARBONATED COMPOSITE

(71) Applicant: CRH Group Services Limited, Dublin (IE)

(72) Inventors: Arno Keulen, Amsterdam (NL); Diego A. Santamaria Razo, Amsterdam (NL)

(73) Assignee: CRH Group Services Limited, Dublin (IE)

( * ) Notice: Subject to any disclaimer, the term of this patent is extended or adjusted under 35 U.S.C. 154(b) by 695 days.

(21) Appl. No.: 17/634,865

(22) PCT Filed: Aug. 14, 2020

(86) PCT No.: PCT/EP2020/072906
§ 371 (c)(1),
(2) Date: Feb. 11, 2022

(87) PCT Pub. No.: WO2021/028581
PCT Pub. Date: Feb. 18, 2021

(65) Prior Publication Data
US 2022/0332655 A1 Oct. 20, 2022

(30) Foreign Application Priority Data
Aug. 15, 2019 (NL) ..................................... 2023648

(51) Int. Cl.
*C04B 24/02* (2006.01)
*B28B 1/14* (2006.01)
(Continued)

(52) U.S. Cl.
CPC .............. *C04B 14/06* (2013.01); *C04B 24/02* (2013.01); *C04B 24/06* (2013.01); *C04B 24/10* (2013.01);
(Continued)

(58) Field of Classification Search
CPC ..... C04B 40/0231; C04B 14/06; C04B 24/02; C04B 24/06; C04B 24/10; C04B 28/04;
(Continued)

(56) References Cited

U.S. PATENT DOCUMENTS 4,069,063 A 1/1978 Ball
6,264,736 B1 * 7/2001 Knopf ................ C04B 40/0231 106/738
(Continued)

FOREIGN PATENT DOCUMENTS

CN 108751840 A * 11/2018 ............ C04B 28/04
JP 2008030974 A 2/2008
(Continued)

OTHER PUBLICATIONS

NO149707-B_Machine_Translation (Year: 1984).*
(Continued)

*Primary Examiner* — Anthony J Green
*Assistant Examiner* — Anastasia A. Kuvayskaya
(74) *Attorney, Agent, or Firm* — Sheridan Ross P.C.

(57) ABSTRACT

The invention relates to a process for producing a composite comprising:

a. providing a particulate material, wherein the particulate material comprises minerals having a content of at least 30% m/m of calcium, magnesium, aluminium, silicon, potassium or iron, or a combination of two or more thereof.
b. providing an aggregate,
c. providing a primary additive, wherein the primary additive comprises a sugar or derivative thereof, a polyol or derivative thereof, an organic acid, an organic acid salt or an inorganic acid, or any combination of two or more thereof,
d. mixing the particulate material, the aggregate and the primary additive with water to form a mixture, and (Continued)

e. carbonating the mixture in the presence of carbon dioxide, wherein the concentration of carbon dioxide is greater than about 2 vol %.

18 Claims, 2 Drawing Sheets

(51) Int. Cl.

| | |
|---|---|
| ***C04B 14/06*** | (2006.01) |
| ***C04B 24/06*** | (2006.01) |
| ***C04B 24/10*** | (2006.01) |
| ***C04B 28/04*** | (2006.01) |
| ***C04B 28/08*** | (2006.01) |
| ***C04B 40/02*** | (2006.01) |
| *C04B 111/00* | (2006.01) |

(52) U.S. Cl.
CPC ............ *C04B 28/04* (2013.01); *C04B 28/082* (2013.01); *C04B 40/0231* (2013.01); *B28B 1/14* (2013.01); *C04B 2111/00019* (2025.05)

(58) Field of Classification Search
CPC ..... C04B 28/082; C04B 28/18; C04B 18/141; B28B 1/14
See application file for complete search history.

(56) References Cited

U.S. PATENT DOCUMENTS

| | | | | |
|---|---|---|---|---|
| 10,350,787 | B2 * | 7/2019 | Forgeron | B01F 35/2132 |
| 2015/0232381 | A1 | 8/2015 | Niven et al. | |
| 2015/0321960 | A1 * | 11/2015 | Kakebeeke | C04B 40/0039 106/491 |
| 2019/0152858 | A1 * | 5/2019 | Briaud | C04B 24/085 |
| 2019/0194074 | A1 * | 6/2019 | Amr | B28B 11/245 |

FOREIGN PATENT DOCUMENTS

| | | | | |
|---|---|---|---|---|
| NO | 149707 B * | 2/1984 | | C04B 40/0231 |
| WO | WO 2009/090226 | 7/2009 | | |
| WO | WO 2009/133120 | 11/2009 | | |
| WO | WO 2014/205577 | 12/2014 | | |
| WO | WO 2015/139121 | 9/2015 | | |
| WO | 2018102931 A1 | 6/2018 | | |
| WO | 2019115722 | 6/2019 | | |
| WO | WO 2019/133040 | 7/2019 | | |
| WO | 2021028581 | 2/2021 | | |

OTHER PUBLICATIONS

CN 108751840 A_Machine Translation (Year: 2018).*
Office Action issued from the European Patent Office on Jun. 19, 2024, in connection with corresponding EP patent application No. 20753785.3.
Office Action issued from the European Patent Office on Jun. 25, 2024, in connection with corresponding EP patent application No. 20753785.3.
Ahmed Hussein El-Baghdadi, "A thesis submitted to McGill University in partial fulfillment of the requirements for the degree of Master of Engineering", 2012.
Written Opinion for PCT/EP2020/072906 dated Sep. 30, 2021, issued from the EPO.
Article 94(3) Communication in connection with EP Application No. 20753785.3, datedJun. 30, 2022, issued from the EPO.
International Search Report for PCT/EP2020/072906 dated Oct. 6, 2020.
International Preliminary Report on Patentability for PCT/EP2020/072906 dated May 27, 2021.
Search Report for NL2023648 dated Apr. 20, 2020.
Search Report for NL2026266 dated Mar. 25, 2021.
Araizi, "Accelerated Carbonation of Wastes and Minerals," Thesis submitted in partial fulfilment of the requirements of the University of Greenwich for the degree of Doctor of Philosophy, Jun. 2015, 231 pages.
Gunning, "Accelerated Carbonation of Hazardous Waste," A thesis submitted in partial fulfilment of the requirements of the University of Greenwich for the degree of Doctor of Philosophy in Chemical Science, Feb. 2011, 235 pages.
Communication of a Notice of Opposition for Europe Patent Application No. 20753785.3, dated Oct. 7, 2025, 127 pages.

* cited by examiner

CARBONATED COMPOSITE

CROSS-REFERENCE TO RELATED APPLICATIONS

The present application is the U.S. National Stage application of International Application No. PCT/EP2020/072906, filed Aug. 14, 2020, which International Application was published on Feb. 18, 2021, as International Publication No. WO2021/028581. The International Application claims priority to Netherland Patent Application No. 2023648, filed Aug. 15, 2019, the contents of which are incorporated herein by reference in their entireties.

The present invention relates to a composite, in particular a carbonated composite, a process for producing a composite and uses of a composite. Further, the present invention relates to the manufacture of construction materials.

BACKGROUND TO THE INVENTION

The increasing concentration of carbon dioxide in the atmosphere, and its effect on the global climate is a cause for concern. Among the biggest contributors of carbon dioxide to the atmosphere is the burning of fuels for power generation, and industrial activity such as the production of steel, cement and lime. Carbon dioxide is emitted in the flue gases from such industrial plants. There is a growing pressure on these industries to reduce their carbon emissions, with an increasing number of governments implementing legislation directed to the reduction of carbon emissions.

The environmental impact of disposing of particulate waste in landfill sites is also a cause for concern. The disposal of particulate waste in landfill sites not only takes up landfill space that is quickly running out, but there is also potential for harmful or even toxic components of the particulate material leaching into the soil and groundwater. Further, there is potential of releasing particulate pollution into the atmosphere. Exposure to atmospheric particulate pollution has been associated with adverse respiratory symptoms such as coughing, aggravated airways and has even been linked with lung cancer and chronic bronchitis. Particulate waste can come from a number of sources, including but not limited to agriculture, construction, industry by-products such as metal production and power plants.

Concrete, in particular prefabricated concrete composites, are widely used in the construction industry. They may be used as building blocks, walls, flooring, paving, road barriers, elements for constructing houses, bridges and infrastructure and in addition to provide various unique functions such as flood protection, such as seawalls. Applications of the concrete composites need to be able to withstand a wide variety of conditions in corrosive environments, such as due to de-icing salt, rain, sunshine, heat, frost, natural carbonation, seawater and acidic environments. The degradation of concrete, such as of seawalls reduces the effectiveness of these barriers and requires replacement which is costly from an environmental point of view as well as from a construction point of view.

There is a need for processes that reduce industrial carbon emissions. Further, there is a need for processes that can use carbon emissions in the manufacture of different products. Further, there is a need for processes that trap carbon emissions and prevent them from entering the atmosphere. Further, there is a need for carbon neutral processes in industry. There is a need for improved processing of waste materials and secondary materials (organic and inorganic). Further, there is a need for products that make new uses of waste materials, by-products and secondary materials. Further, there is a need for products that can utilise carbon dioxide in their manufacture. Further there is a need for improved concrete composites which are sustainable and durable. In particular, there is a need for improved materials for corrosive environments, such as due to de-icing salt, rain, sunshine, wind, heat, frost, acids, natural carbonation and seawater. There is a need for concrete composites with improved chemical resistance and durability. There is a need for concrete composites with reduced curing times. There is a need for concrete composites with high compressive strength.

It is, therefore, an object of the present invention to seek to alleviate the above identified problems.

SUMMARY OF THE INVENTION

In a first aspect of the present invention, there is provided a process for producing a composite comprising:

a) providing a particulate material, wherein the particulate material comprises minerals having a content of at least 30% m/m of calcium, magnesium, aluminium, silicon, potassium or iron, or a combination of two or more thereof,
b) providing an aggregate,
c) providing a primary additive, wherein the primary additive comprises a sugar or derivative thereof, a polyol or derivative thereof, an organic acid, an organic acid salt or an inorganic acid, or any combination of two or more thereof,
d) mixing the particulate material, the aggregate and the primary additive with water to form a mixture, and
e) carbonating the mixture in the presence of carbon dioxide, wherein the concentration of carbon dioxide is greater than about 2 vol %.

In a second aspect of the present invention, there is provided a composite produced by the process according to the first aspect.

In a third aspect of the present invention, there is provided use of a composite produced by the process according to the first aspect, or a composite according to the second aspect of the invention, as a construction/building material.

DETAILED DESCRIPTION

The present invention relates to a process for producing a composite comprising:

a) providing a particulate material, wherein the particulate material comprises minerals having a content of at least 30% m/m of calcium, magnesium, aluminium, silicon, potassium or iron, or a combination of two or more thereof,
b) providing an aggregate,
c) providing a primary additive, wherein the primary additive comprises a sugar or derivative thereof, a polyol or derivative thereof, an organic acid, an organic acid salt or an inorganic acid, or any combination of two or more thereof,
d) mixing the particulate material, the aggregate and the primary additive with water to form a mixture, and
e) carbonating the mixture in the presence of carbon dioxide, wherein the concentration of carbon dioxide is greater than about 2 vol %.

It is an advantage of the present invention that carbon dioxide is captured which reduces carbon emissions. In particular, the present invention can reduce industrial carbon emission by capturing, adsorbing, fixing and storing carbon dioxide in the composite of the invention which prevents the carbon dioxide from entering the atmosphere. It is an advantage that the process of the invention can be carbon neutral, or even be carbon negative. It is a further advantage that the present invention can utilise waste materials or primary of secondary mineral, mineral wastes, mineral by-products. Surprisingly, it has been found that composites made in accordance with the present invention are denser than those made by other methods. Further, as shown in the examples, it has been found that composites of the present invention have a higher compressive strength than those without the primary additive. Further they have a finer pore structure and are already carbonated which increases their chemical resistance to degradation, such as to de-icing salt, heat, frost, acid environments, natural carbonation and sea-water and thus the composites of the invention are more durable, as well as sustainable. This enhanced chemical resistance is highly desirable in uses such as flood defences, and particularly seawalls. Seawalls are known to be salty environments. It is believed that the inclusion of the primary additive, in combination with the carbonating step densifies the matrix and makes the composite more durable, giving it a higher material strength and a higher resistance to salt ingress or from other substances.

Preferably, the particulate material may be referred to as a reactive component.

Preferably, the particulate material comprises minerals having a content of at least 30% m/m of calcium, magnesium, aluminium, silicon or iron, or a combination of two or more thereof, preferably minerals having a content of at least 30% m/m of calcium, magnesium, aluminium or silicon or a combination of two or more thereof.

Preferably, the particulate material comprises a metal oxide, a metal hydroxide or a metal silicate, or a combination of two or more thereof, preferably calcium oxide, calcium hydroxide, a calcium silicate, magnesium oxide, magnesium hydroxide, a magnesium silicate or an iron silicate or any combination of two or more thereof, preferably calcium oxide, calcium hydroxide, a calcium silicate, magnesium oxide, magnesium hydroxide or a magnesium silicate or any combination of two or more thereof, preferably, the particulate material comprises calcium oxide, calcium hydroxide or a calcium silicate, or any combination of two or more thereof, preferably calcium oxide or calcium hydroxide, most preferably the particulate material comprises calcium oxide. Preferably, the particulate material comprises a calcium silicate, a calcium aluminate, an iron silicate, a calcium ferrite, a calcium aluminate ferrite, a magnesium silicate, a magnesium aluminate, a magnesium ferrite or any combination of two or more thereof, The preferred incorporation of the reactive metal silicate powders (such as sodium meta silicate) initiates the carbonation process at an earlier stage and allows for a greater extent of carbonate matrix to be formed within the mixture material.

Calcium silicates have varying proportions of calcium as calcium oxide, and silicon as silicon dioxide. Calcium silicates may be anhydrous or hydrated. Calcium silicate may preferably comprise other constituents such as magnesium ions, aluminium ions, potassium ions, iron ions, or silicon as silicon dioxide.

Preferably calcium silicate is formed of varying proportions of calcium as calcium oxide, and silicon as silicon dioxide and optionally water, aluminium as aluminium oxide and/or iron as iron oxide. Preferably other metal cation silicates, such as magnesium, iron and potassium are formed of varying proportions of metal as a metal oxide, and silicon as silicon dioxide and optionally water and aluminium as aluminium oxide.

Preferred calcium silicates include calcium orthosilicate—$Ca_2SiO_4$, wollastonite—$CaSiO_3$, bellite—$2CaO·SiO_2$, and/or tricalcium silicate—$3CaO·SiO_2$.

An advantage of the process is that carbon dioxide emissions are reduced by capturing carbon dioxide in the composite such as shown by the following reaction schemes.

Calcium oxide:

$$CaO+CO_2\rightarrow CaCO_3$$

Calcium hydroxide:

$$Ca(OH)_2+CO_2\rightarrow CaCO_3+H_2O$$

Tricalcium silicate ($C_3S$):

$$2Ca_3SiO_5+7H_2O\rightarrow 3CaO·SiO_2·4H_2O+3Ca(OH)_2$$

$$Ca(OH)_2+CO_2\rightarrow CaCO_3+H_2O$$

Bellite ($C_2S$)—

$$2Ca_2SiO_4+4H_2O\rightarrow 3CaO·2SiO_2·3H_2O+Ca(OH)_2$$

$$Ca(OH)_2+CO_2\rightarrow CaCO_3+H_2O$$

As shown above, calcium silicates may react directly with carbon dioxide, or may react first with water to produce calcium hydroxide. Calcium hydroxide may further react with carbon dioxide to form calcium carbonate. It will be appreciated that other calcium silicates will have different reaction schemes which will result in the formation of calcium carbonate or aluminium silicates. Calcium silicates may also react with water to produce calcium silicate hydrate. Calcium silicate hydrate may react with carbon dioxide to form calcium silicate structures.

Preferably, the carbonation step results in the formation of calcium carbonate, magnesium carbonate, calcium silicates, magnesium silicates, calcium alumina silicates, magnesium alumina silicates or any combination of two or more thereof. Carbonates and metal silicates, are suitable binder to hold the composite together. It provides structural rigidity to the composite. Further they may be produced to act as a binder to provide additional structural rigidity.

Preferably, the carbonation step results in the formation of calcium carbonate, magnesium carbonate, calcium alumina silicates or any combination of two or more thereof, preferably calcium carbonate or magnesium carbonate, preferably calcium carbonates. Carbonates, and in particular calcium carbonate is a suitable binder to hold the composite together. It provides structural rigidity to the composite. Further carbonates may be produced to act as a binder to provide additional structural rigidity, such as potassium carbonate.

Further, the optional formation of calcium aluminium silicate hydrates and/or calcium silicate hydrates, iron silicates hydrates and magnesium silicate hydrates and/or magnesium aluminite silicate hydrates, may also act as a binder. Further, the optional formation of aluminium silicate hydrates and/or calcium silicate hydrates may also act as a binder. Such aluminium silicate hydrates are well known in cement production.

The formation of calcium carbonate, magnesium carbonate, and optionally potassium carbonate generating an exothermal reaction can help expel water as the composite is formed. This also applies to the formation of metal silicates. Further, applying pressure during the formation of the composite can also expel water as the composite is formed. Further, the application of heat can help evaporate water from the composite, such as by applying hot air. Heat may advantageously be supplied from a kiln Preferably, about 5% to about 100% by weight of the particulate material is selected from calcium oxide, calcium hydroxide, a calcium silicate, magnesium oxide, magnesium hydroxide, a magnesium silicate or an iron silicate, or any combination of two or more thereof, more preferably about 25% to about 95% by weight of the particulate material is selected from calcium oxide, calcium hydroxide, a calcium silicate, magnesium oxide, magnesium hydroxide, a magnesium silicate or an iron silicate, or any combination of two or more thereof, more preferably about 30% to about 85% by weight of the particulate material is selected from calcium oxide, calcium hydroxide, a calcium silicate, magnesium oxide, magnesium hydroxide, a magnesium silicate or an iron silicate, or any combination of two or more thereof, more preferably about 40% to about 70% by weight of the particulate material is selected calcium oxide, calcium hydroxide, a calcium silicate, magnesium oxide, magnesium hydroxide, a magnesium silicate or an iron silicate, or any combination of two or more thereof. Such proportions of calcium oxide, calcium hydroxide, a calcium silicate. magnesium oxide, magnesium hydroxide, a magnesium silicate or an iron silicate, or any combination of two or more thereof are suitable to react to form a calcium carbonate binder, and/or a magnesium carbonate binder to hold the composite together.

Preferably, about 5% to about 100% by weight of the particulate material is selected from calcium oxide, calcium hydroxide, a calcium silicate, calcium aluminate, calcium ferrite, calcium aluminate ferrite, magnesium oxide, magnesium hydroxide, a magnesium silicate, magnesium aluminate silicate, or an iron silicate, or any combination of two or more thereof, more preferably about 25% to about 95% by weight of the particulate material is selected from calcium oxide, calcium hydroxide, a calcium silicate, calcium aluminate, calcium ferrite, calcium aluminate ferrite, magnesium oxide, magnesium hydroxide, a magnesium silicate, magnesium aluminate silicate, or an iron silicate, or any combination of two or more thereof, more preferably about 30% to about 85% by weight of the particulate material is selected from calcium oxide, calcium hydroxide, a calcium silicate, calcium aluminate, calcium ferrite, calcium aluminate ferrite, magnesium oxide, magnesium hydroxide, a magnesium silicate, magnesium aluminate silicate, or an iron silicate, or any combination of two or more thereof, more preferably about 40% to about 70% by weight of the particulate material is selected from calcium oxide, calcium hydroxide, a calcium silicate, calcium aluminate, calcium ferrite, calcium aluminate ferrite, magnesium oxide, magnesium hydroxide, a magnesium silicate, magnesium aluminate silicate, or an iron silicate, or any combination of two or more thereof. Such proportions of calcium oxide, calcium hydroxide, a calcium silicate, calcium aluminate, calcium ferrite, calcium aluminate ferrite, magnesium oxide, magnesium hydroxide, a magnesium silicate, magnesium aluminate silicate, or an iron silicate, or any combination of two or more thereof are suitable to react to form a calcium carbonate binder, and/or a magnesium carbonate binder to hold the composite together.

Preferably, about 10% to about 100% by weight of the particulate material is selected from calcium oxide, calcium hydroxide or a calcium silicate, or any combination of two or more thereof, more preferably about 25% to about 95% by weight of the particulate material is selected from calcium oxide, calcium hydroxide or a calcium silicate, or any combination of two or more thereof, more preferably about 30% to about 85% by weight of the particulate material is selected from calcium oxide, calcium hydroxide or a calcium silicate, or any combination of two or more thereof, more preferably about 40% to about 70% by weight of the particulate material is selected from calcium oxide, calcium hydroxide or a calcium silicate, or any combination of two or more thereof. Such proportions of calcium oxide, calcium hydroxide or a calcium silicate, or any combination of two or more thereof are suitable to react to form a calcium carbonate binder to hold the composite together.

Preferably, about 10% to about 100% by weight of the particulate material is selected from calcium oxide or calcium hydroxide, or any combination thereof, more preferably about 25% to about 95% by weight of the particulate material is selected from calcium oxide or calcium hydroxide, or any combination thereof, more preferably about 30% to about 85% by weight of the particulate material is selected from calcium oxide or calcium hydroxide, or any combination thereof, more preferably about 40% to about 70% by weight of the particulate material is selected from calcium oxide or calcium hydroxide, or any combination thereof. Such proportions of calcium oxide or calcium hydroxide, or any combination thereof is suitable to react to form a calcium carbonate binder to hold the composite together. Calcium oxide and calcium hydroxide are particularly preferred as they can react directly with carbon dioxide to form calcium carbonate.

Preferably, about 10% to about 100% by weight of the particulate material is calcium oxide, more preferably about 25% to about 95% by weight of the particulate material is calcium oxide, more preferably about 30% to about 85% by weight of the particulate material is calcium oxide, more preferably about 40% to about 70% by weight of the particulate material is calcium oxide. Such proportions of calcium oxide are suitable to react to form a calcium carbonate binder to hold the composite together. Calcium oxide is particularly preferred because it reacts directly with carbon dioxide to form calcium carbonate, without producing any by-products, such as water. This makes the process more efficient as excess water does not need to be removed or incorporated into the composite.

Preferably, about 10% N to about 100% by weight of the particulate material is a calcium silicate or a magnesium silicate, or a combination of two or more thereof, more preferably about 25% to about 95% by weight of the particulate material is a calcium silicate or a magnesium silicate, or a combination of two or more thereof, more preferably about 30% to about 85% by weight of the particulate material is a calcium silicate or a magnesium silicate, or a combination of two or more thereof, more preferably about 40% to about 70% by weight of the particulate material is a calcium silicate or a magnesium silicate, or a combination of two or more thereof. Such proportions of is a calcium silicate or a magnesium silicate, or a combination of two or more thereof are suitable to react to form a silicate binder to hold the composite together.

Preferably, the particulate material further comprises aluminium oxide, silicon dioxide, an iron oxide, calcium ferrite, an aluminium silicate, a sodium silicate, a potassium silicate, calcium sulphate, magnesium sulphate, potassium sulphate or sodium sulphate, or any combination of two or more thereof. Preferably, the particulate material further comprises aluminium oxide, silicon dioxide, iron oxide, calcium ferrite, an aluminium silicate, or a sodium silicate, or any combination of two or more thereof.

An advantage of including further constituents is that they may also react to help harden the composite. This may be a hydration reaction, carbonation reaction, or a further reaction. These reactions of further constituents improve the strength of the resulting carbonate, in particular the composite.

Preferably, the particulate material is at least about 5 wt % amorphous, preferably at least about 30 wt % amorphous, preferably at least about 80 wt % amorphous, preferably substantially amorphous. This helps increase the reactivity of the particulate material.

The particulate material may be substantially crystalline. Preferably, the particular material is at least about 5 wt % to about 100% crystalline, preferably at least about 30 wt % crystalline, preferably at least about 80 wt % crystalline, preferably substantially crystalline. This helps increase the reactivity of the particulate material and thus increase the strength of the composite.

Preferably, the particulate material comprises blast furnace slag, meta kaolin, calcinated clay, olivine, serpentine, Portland cement, cement by-pass dust, lime kiln dust, cement kiln dust, air pollution control residue, Portland clinker, cement, limestone powder, quicklime, rock fines, concrete fines, mine tailings, fly ash, bottom ash, biomass ash, metallurgy slag, red mud, paper ash, dusts, oil shale ash, metal silicate powder, metal hydroxide powder, calcium sulphate, pozzolanic material or bleaching earth material, or any combination of two or more thereof, preferably, the particulate material comprises blast furnace slag, metallurgy slag, Portland cement, Portland clinker, cement, air pollution control residue or any combination of two or more thereof, preferably, the particulate material comprises steel slag, stainless steel slag, copper slag, lead slag, Portland cement, Portland clinker, cement, cement by-pass dust, lime kiln dust, cement kiln dust, fly ash or bottom ash or any combination of two or more thereof, preferably the particulate material comprises blast furnace slag or metallurgy slag preferably steel slag or stainless steel slag.

Preferably, the particulate material comprises blast furnace slag, meta kaolin, calcinated clay, olivine, serpentine, Portland cement, cement by-pass dust, lime kiln dust, cement kiln dust, air pollution control residue, Portland clinker, cement, limestone powder, dolomite powder, quicklime, rock fines, concrete fines, mine tailings, fly ash, bottom ash, biomass ash, metallurgy red mud, paper ash, dusts, oil shale ash, metal (meta) silicate powder, metal hydroxide powder, calcium sulphate, pozzolanic crystalline materials or bleaching earth material, or any combination of two or more thereof, preferably, the particulate material comprises converter steel slag, ladle steel slag, synthetic slag, or any combination of two or more thereof.

It is an advantage of the process of the invention that it makes use of waste materials that would otherwise be disposed of, thereby reducing some of the damaging effects on the environment. The present invention provides an alternative use for these materials rather than disposing of them in landfill.

Preferably the Portland cement or quick lime, or Portland clinker are out of date. This means that the best before date for these has been passed.

Preferably, the fly ash and bottom ash is from burning coal, biomass, manure or waste, such as household waste, or is produced by industries such as glass production, oil and gas refinement.

Preferably, the meta kaolin, calcinated clay is produced from mine tailings and mining wastes and natural clay deposits.

Preferably, the blast furnace slag or metallurgy slags is from metal production, such as the production of metal smelts, iron, steel, stainless steel, copper, lead, nickel or zinc, preferably the blast furnace slag is steel slag.

Preferably, the bleaching earth material is from industry, producing natural oil such as palm oil, preferably the bleaching earth material is bleaching earth filtrate material.

Preferably, the particulate material may be in the form of a fine powder with an average particle size of about 0.5 μm to about 1 mm, preferably about 1 μm to about 1 mm, preferably about 5 μm to about 500 μm. An advantage of using particles of this size is that they have a relatively large surface area which maximises the efficiency of the carbonation reaction. Further, it is an advantage of the present invention that such fine powders can be used as a starting material and incorporated into a larger final composite for further use.

Preferably, the particulate material may be in the form of a granule with an average particle size of about 1 mm to about 60 mm, preferably about 1 mm to about 40 mm, most preferably about 1 mm to about 30 mm. Such particle sizes have the advantage of not requiring specialist equipment to handle them as they are of a relatively large size.

The average particle size may be measured by laser diffraction or sieving, preferably by laser diffraction.

The average particle size of the particulate material may be reduced, such as by milling, grinding, or crushing. Further, the particulate material may be made from a larger piece or pieces of material such as by grinding or crushing.

It is an advantage of using particles of this size as they have a relatively large surface area which maximises the efficiency of the carbonation reaction, maximising the extent to which the carbonate matrix can form. It is a further advantage of using particles of this size as they are easily mixed into the forming mixture allowing for the easier distribution throughout when using conventional mixing techniques known in the field.

A further advantage of grinding the particulate material is that it preferably increases the amount of amorphous or crystalline material present which increases the rate of the carbonation reaction. This is particularly advantageous when the particulate material comprises slag or ashes, preferably synthetic slags, steel slag or ashes from power or biomass incinerator plants Preferably, the process comprises washing the particulate material with water, preferably washing the particulate material with water prior to mixing step (d). An advantage of washing the particulate material is that water soluble salts are removed, such as sodium chloride, potassium chloride, magnesium chloride and sulphates. These salts can then be used for other processes, such as after they have been recovered by evaporation. It is advantageous to remove such water-soluble salts because they are undesirable impurities. For example, in processes such as the manufacture of concrete, the amount of salt needs to be carefully controlled. The presence of such salt may weaken the strength development and reduce the durability of any resulting concrete, particularly steel reinforced concrete.

A further advantage of washing the particulate material is that water soluble heavy metals are removed, such as cationic and anionic metal species. These metals can then be used for other processes, such as after they have been recovered by evaporation. These metals can also be recovered by complexation. It is advantageous to remove such water-soluble heavy metals because they are undesirable impurities. For example, in processes such as the manufacture of cement, the amount of water-soluble heavy metals needs to be carefully controlled. The presence of such metals may weaken the strength development and reduce the durability of any resulting concrete, particularly steel reinforced concrete.

A further advantage of washing the particulate material is that the presence of water can start a curing process of the particulate material. In particular, calcium oxide can react with water to form calcium hydroxide. Further, calcium silicates can react with water to form calcium silicate hydrates which act as an additional binder for the composite.

The washing step is particularly advantageous when the particulate material comprises cement kiln dust or lime kiln dust, ash and slag as these materials typically contain unwanted salts. Further, the composition of these materials means that they start to cure in the presence of water.

After the washing step has been carried out, the particulate material may be pressed, filtered or processed under vacuum to remove excess water. This has the advantage of removing salts dissolved in the water from the particulate material and removing excess water. This has the further advantage of removing heavy metals dissolved in the water from the particulate material.

Preferably, the process further comprises providing a material from organic origin, wherein step (d) comprises mixing the particulate material, the aggregate, the primary additive and the material from organic origin with water to form a mixture. Preferably the material from organic origin comprises wood, paper, plastic, sludge, natural fibre, cellulose or plants. Including such a material from organic origin with reduce the weight of the resulting composite. Further it allows another waste material to be used.

Preferably, the aggregate comprises primary aggregate, secondary aggregate or recycled aggregate, preferably sand, rock, concrete fines, slag, ashes or recycled concrete, artificial aggregates or any combination of two or more thereof, preferably man-made carbon dioxide negative artificial aggregate. Preferably, the aggregate comprises primary aggregate, secondary aggregate or recycled aggregate, preferably sand, rock, concrete fines, slag, or recycled concrete, or any combination of two or more thereof, preferably man-made carbon dioxide negative aggregate. Man-made carbon dioxide negative aggregate preferably means an aggregate made by the reaction of carbon dioxide with a particulate material, preferably wherein calcium carbonate is formed. The amount of carbon dioxide used up in the process is preferably less than the amount of carbon dioxide produced by making the aggregate.

Preferably, the aggregate has an average particle size of about 0.1 mm to about 90 mm, preferably about 0.5 mm to about 50 mm, preferably about 1 mm to about 45 mm, preferably about 2 mm to about 40 mm, preferably about 4 mm to about 30 mm.

An advantage of using aggregate with such particle sizes is that they are easily handled and processed with current techniques in the field, meaning that no adaptations to current apparatus are necessary and so the process can be easily adopted in industry.

The average particle size may be measured by laser diffraction or sieving, preferably by laser diffraction.

The average particle size of the aggregate may be reduced, such as by milling, grinding, or crushing. Further, the aggregate material may be made from a larger piece or pieces of material such as by milling, grinding or crushing.

Preferably the average size of the aggregate is greater than the average size of the particulate material, preferably the ratio of the average size of the aggregate to the average size of the particulate material is at least about 2:1, preferably at least about 3:1, preferably in the range of about 2:1 to about 100:1, preferably about 5:1 to about 20:1.

It is an advantage of the process of the invention that a sugar or derivative thereof, a polyol or derivative thereof, an organic acid, an organic acid salt or an inorganic acid or any combination of two or more thereof may form complexes with metal ions present in the mixture. These metal ion complexes can then aid uniform distribution of metal ions throughout the mixture, thereby allowing for the formation of a substantially uniform carbonate matrix following the subsequent carbonation step. In particular, the primary additive is believed to form complexes with cations such as calcium or magnesium ions, which helps distribute and improve the reaction rate of the cations such as calcium or magnesium ions throughout the mixture and at the surface of the mineral binder. In the carbonation step, the cations such as calcium or magnesium ions are thus distributed throughout the mixture and form a more uniform carbonate matrix, such as calcium- or magnesium carbonate matrix or densified layer around the binder particle than if the primary additive is not used.

Preferably, the primary additive is provided in the form of a solution, a colloidal suspension, or a powder, preferably an aqueous solution or an aqueous colloidal suspension, preferably an aqueous solution.

It is an advantage for the primary additive to be incorporated in the form of a solution, a colloidal suspension or a powder to further enable uniform distribution throughout the whole of the mixture, using current techniques of the field. It is particularly advantageous for these to be aqueous, as water is added at the mixing stage. An aqueous solution is particularly preferred as it allows the primary additive to be easily mixed in the mixture.

Preferably, the primary additive comprises a sugar or derivative thereof, a polyol or derivative thereof, an organic acid, or an organic acid salt or any combination of two or more thereof, preferably a sugar or derivative thereof or a polyol or a derivative thereof or any combination of two or more thereof, preferably a sugar or derivative thereof.

Preferably the sugar or derivative thereof comprises a monosaccharide or derivative thereof, a disaccharide or derivative thereof, an oligosaccharide or a derivative thereof or a polysaccharide or a derivative thereof, or any combination of two or more thereof. It has been found that such additives have particular utility in complexing with metal ions, such as calcium ions.

Preferably, the primary additive comprises a monosaccharide or derivative thereof, a disaccharide or derivative thereof, an oligosaccharide or a derivative thereof or any combination of two or more thereof. It has been found that such additives have particular utility in complexing with metal ions, such as calcium ions.

Preferably, the monosaccharide comprises fructose, glucose, galactose, ribose, xylose, arabinose, mannose or idose, or a derivative of any thereof, or any combination of two or more thereof.

Preferably, the monosaccharide derivative comprises glucuronic acid, gluconic acid, glucosamine, galacturonic acid, galactosamine, ribonic acid, xylonic acid, arabinonic acid, arabinosamine, mannosamine, mannonic acid, iduronic acid, idosamine, sorbitol or neuraminic acid, or any combination of two or more thereof.

Preferably, the disaccharide comprises sucrose, lactulose, lactose, maltose, trehalose or cellobiose, or a derivative of any thereof, or any combination of two or more thereof.

Preferably, the disaccharide derivative comprises chitobiose, lactosamine, sucralose or trehalosamine, or any combination of two or more thereof.

Preferably, the oligosaccharide is substantially comprised of about 3 to about 10 monosaccharides as described above.

Preferably, the oligosaccharide comprises a fructo-oligosaccharide or a galactooligosaccharide or a derivative of any thereof, or any combination of two or more thereof.

Preferably, the oligosaccharide derivative is substantially comprised of one or more monosaccharide derivatives as described above.

Preferably, the polysaccharide is substantially comprised of about 10 or more monosaccharides as described above.

Preferably, the polysaccharide comprises starch, amylose, amylopectin, chitin, pectin, cellulose, hemicellulose, glycogen, dextrin, maltodextrin, dextran or arabinoxylans, or a derivative of any thereof, or any combination of two or more thereof.

Preferably, the polysaccharide derivative is substantially comprised of one or more monosaccharide derivatives as described above.

Preferably, the polysaccharide derivative comprises hyaluronates, dermatan sulphates, chondroitin sulphates, heparin, heparan sulphates or keratan sulphates, or any combination of two or more thereof.

The sugar may comprise molasses.

Preferably, the polyol comprises a sugar alcohol, preferably glycerol, lactitol, isomalt, maltitol, mannitol, xylitol, or any combination of two or more thereof.

It is an advantage of the process of the present invention that the primary additive is readily available and can be sustainably sourced from renewable sources.

Preferably the organic acid comprises a carboxylic acid, or a sulphonic acid, preferably a carboxylic acid.

Preferably carboxylic acid means a carboxylic acid containing compound. Preferably sulphonic acid means a compound of the formula $RSO_3H$, wherein R contains at least one carbon.

Preferably the organic acid salt comprises a metal salt of an organic acid, preferably a sodium, calcium, magnesium or potassium salt.

Preferably organic acid salt means an organic acid salt containing compound.

Preferably the organic acid salt comprises a carboxylate salt, or a sulphonate salt, preferably a carboxylate salt.

Preferably the primary additive comprises a carboxylic acid containing compound or carboxylate salt containing compound.

Preferably, the sulphonic acid comprises cyclamate.

Preferably, the sulphonate salt comprises N-Hydroxysulfosuccinimide sodium salt and/or sodium cyclamate.

Preferably, the carboxylic acid containing compound or carboxylate salt containing compound comprises citric acid, sodium gluconate, sodium citrate, calcium citrate, acetic acid, sodium acetate, calcium acetate, formic acid, glyceric acid, ascorbic acid, tartaric acid, oxalic acid, malic acid, lactic acid, *stevia*, aspartame, lead acetate or alitame, or any combination of two or more thereof.

Preferably, the carboxylic acid containing compound or carboxylate salt containing compound comprises citric acid, sodium citrate, calcium citrate, acetic acid, sodium acetate, calcium acetate or formic acid, or any combination of two or more thereof.

Preferably the carboxylic acid containing compound comprises citric acid, acetic acid, formic acid, glyceric acid, ascorbic acid, tartaric acid, oxalic acid, malic acid or lactic acid, or any combination of two or more thereof.

Preferably, the primary additive comprises sucrose, sodium gluconate, glucose, lactic acid, calcium citrate or glycerol, or a combination of two or more thereof, preferably sucrose, sodium gluconate, glucose, or glycerol, or a combination of two or more thereof, preferably sucrose, sodium gluconate or glucose, or a combination of two or more thereof, Preferably, the mixture comprises about 0.001 wt % to about 10 wt % of the primary additive on a dry weight basis, preferably about 0.005 wt % to about 10 wt % of the primary additive on a dry weight basis, preferably from about 0.01 wt % to about 5 wt % on a dry weight basis, preferably, from about 0.02 wt % to about 3 wt % on a dry weight basis. Most preferably, the mixture comprises about 0.001 wt % to about 0.1 wt % of the primary additive on a dry weight basis, Preferably, the mixture comprises about 0.001 wt % to about 10 wt % of the primary additive as a percentage of the particulate material, preferably about 0.005 wt % to about 10 wt % of the primary additive as a percentage of the particulate material, preferably from about 0.01 wt % to about 5 wt % as a percentage of the particulate material, preferably, from about 0.02 wt % to about 3 wt % as a percentage of the particulate material.

It is an advantage of the process of the present invention that the observed effect is achieved requiring only a small amount of primary additive, relative to the amount of mixture, thereby minimising manufacturing costs while also minimising carbon footprint.

Preferably, the process further comprises providing a further additive, wherein step (d) comprises mixing the particulate material, the aggregate, the primary additive and the further additive with water to form a mixture.

Preferably, the further additive comprises a bicarbonate.

Preferably, the further additive is provided in the form of a liquid or a powder.

Preferably, the further additive comprises sodium bicarbonate, potassium bicarbonate, caesium bicarbonate, magnesium bicarbonate, calcium bicarbonate, ammonium bicarbonate or carbonic acid, or any combination of two or more thereof.

The preferred incorporation of the bicarbonate further additive initiates the carbonation process at an earlier stage and allows for a greater extent of carbonate matrix to be formed within the mixture material.

Preferably the further additive comprises calcium nitrate and/or sodium nitrate. An advantage of this is that this increases the speed of the hardening of the composite.

Preferably, the further additive comprises a plasticizer, preferably polycarboxylate ether and/or polycarboxylate. A plasticizer can be used to improve the strength of the resulting composite.

Preferably, the further additive comprises fibres or nanomaterials, preferably carbon fibres, carbon nanotubes, natural fibres, plastic fibres, glass fibres, stone fibres, mineral wool fibres or steel fibres or any combination of two or more thereof.

Preferably the further additive is used in an amount of about 0.0001 wt % to about 15 wt % on a dry weight basis of the mixture, preferably about 0.001 wt % to about 5 wt % on a dry weight basis of the mixture, preferably about 0.01 wt % to about 5 wt % on a dry weight basis of the mixture, preferably about 0.1 wt % to about 2 wt % on a dry weight basis of the mixture.

Preferably the further additive is used in an amount of about 0.001 wt % to about 15 wt % as a percentage of the particulate material, preferably about 0.001 wt % to about 5 wt as a percentage of the particulate material, preferably about 0.01 wt % to about 5 wt % as a percentage of the particulate material, preferably about 0.1 wt % to about 2 wt % as a percentage of the particulate material.

Preferably, the water provided in step (d) is waste water. This has the advantage of using another waste product in the present invention. The waste water preferably comprises organic complexes, inorganic complexes or metals and combinations thereof. The waste water may further help cure the mixture.

Preferably, the water used to form the mixture comprises dissolved carbon dioxide.

Using water comprising dissolved carbon dioxide in forming the mixture provides for a method in which the carbonation process can be initiated early and quickly, and can therefore accelerate the carbonation procedure, reducing the time required for curing.

Preferably, the water used to form the mixture comprises dissolved carbon dioxide from about 0.5 g/L to about 12 g/L, preferably from about 1 g/L to about 5 g/L, preferably from about 2 g/L to about 12 g/L, preferably from about 3 g/L to about 10 g/L, preferably from about 4 g/L to about 8 g/L. Such amounts are suitable for the carbonation step.

Preferably, the mixture is shaped prior to step (e), preferably wherein the mixture is shaped using a mold or a support. Such a shaping step allows the resulting composite to have the desired form.

It is an advantage of the process of the present invention that the mixture can be shaped by a mold or a support in forming a composite of any desired molded shape. This is particularly useful for creating composites with the same features consistently. Further, it allows composite pieces with intricate shaping or design features to be made.

Preferably, the mixture is separated from the mold or the support before undergoing carbonation in step (e). Preferably, the mixture remains in the mold or on the support for a period of from about 2 s to about 72 hours, and is then separated from the mold or the support before undergoing carbonation, preferably for a period of from about 10 s to about 60 hours, preferably for a period from of about 1 minute to about 48 hours, preferably for a period of from about 4 hours to about 36 hours, preferably for a period of from about 6 hours to about 36 hours. It is advantageous for the mixture to lose water when it remains in the mold or on the support as this facilitates the later carbonation step. Preferably the mixture remains in the mold or on the support for a period of from about 1 s to about 2 hours. This is particularly preferred for products such as elements, pavers, blocks, slabs and briquettes, preferably pavers and briquettes.

Preferably, the mixture undergoes carbonation whilst in the mold or on the support (i) immediately after it has been shaped, or (ii) after the mixture has remained in the mold or on the support for a period of from about 1 hour to about 72 hours, preferably for a period of from about 3 hours to about 60 hours, preferably for a period of from about 4 hours to about 48 hours, preferably for a period of from about 6 hours to about 36 hours, preferably for a period of from about 3 hours to about 24 hours, preferably for a period of from about 3 hours to about 12 hours, preferably for a period of from about 4 hours to about 8 hours. It is advantageous for the mixture to remain in the mold or on the support to help it retain its shape.

Preferably, the process comprises removing water (precuring) from the mixture. It is an advantage of the process of the present invention that optionally removing water from the mixture increases the porosity of the mixture material. This allows carbon dioxide to penetrate into the mixture easily during the carbonation step, accelerating the formation of the carbonate matrix.

Preferably, the process comprises removing water from the mixture prior to the mixture being shaped. This helps the formation of a composite of the desired shape as there is less water to be removed during the carbonation step.

The formation of calcium carbonate, and optionally magnesium carbonate and/or potassium carbonate and related silicate phases generating an exothermal reaction can help expel water as the composite is formed. Further, applying pressure during the formation of the composite can also expel water as the composite is formed. Further, the application of heat can help evaporate water from the composite, such as by applying hot air or forced air. Heat may advantageously be supplied from a kiln Preferably, the water is removed from the mixture at a temperature from about 5° C. to about 80° C., preferably from about 5° C. to about 70° C., preferably from about 5° C. to about 60° C., preferably from about 10° C. to about 80° C., preferably from about 15° C. to about 70° C., preferably from about 20° C. to about 60° C., preferably in the range of about 30° C. to about 50° C.

Preferably, the mixture comprises from about 0.1 wt % to about 60 wt % of free water, preferably from about 0.5 wt % to about 30 wt %, preferably from about 1 wt % to about 20 wt %, preferably from about 1 wt % to about 10 wt %. Such amounts are preferred for the desired porosity of the mixture. Preferably the amount of free water in the mixture is measured prior to the carbonation step, preferably immediately prior to the carbonation step. Preferably immediately prior means less than 30 minutes before, preferably less than 10 minutes before, preferably less than 5 minutes before.

Free water is water that is not bound to another component. Free water does not include water which forms a hydrate.

Preferably the dry weight ratio of the particulate material to the aggregate is about 1:15 to about 1:1, preferably wherein the dry weight ratio of the particulate material to the aggregate is about 1:10 to about 1:5. Such ratios allow a concrete composite to be formed.

Preferably the particulate material, the aggregate and the primary additive are mixed such that all are present throughout the mixture, preferably the mixture is substantially homogeneous. This helps to produce a uniform product, with a known composition.

Preferably the mixture comprises about 5% to about 99% on a dry weight basis of aggregate, preferably about 10% to about 80% on a dry weight basis of aggregate, preferably about 5% to about 60% on a dry weight basis of aggregate, preferably about 10% to about 50%, preferably about 15% to about 40%, such as more than about 35% on a dry weight basis. Such amounts are suitable for giving the resulting composite rigidity.

Preferably the mixture comprises about 1% to about 60% on a dry weight basis of particulate material, preferably about 1% to about 50%, preferably about 1% to about 40%, preferably about 5% to about 60% on a dry weight basis of particulate material, preferably about 10% to about 50%, preferably about 15% to about 40%, such as more than about 35% on a dry weight basis. Such amounts are suitable for providing sufficient calcium carbonate in the resulting composite.

Preferably, the mixture is carbonated in the presence of a gas comprising carbon dioxide concentration from about 2 vol % to about 100 vol %, preferably from about 5 vol % to about 90 vol %, preferably from about 7.5 vol % to about 85 vol %, preferably from about 10 vol % to about 80 vol %, preferably from about 20 vol % to about 80 vol %. Such amounts are suitable for the carbonation reaction to occur.

It is an advantage of the process of the present invention that the gas comprising carbon dioxide can be the flue gas from industrial activity such as a power plant, biomass or waste incinerator plant, metallurgy (steel) plant, crude oil processing plant or kiln, thereby reducing the carbon footprint of that industrial process by trapping the carbon dioxide within the composite being formed.

Preferably, the carbonation is carried out for a period of from about 1 hour to about 48 hours, preferably from about 6 hours to about 36 hours, preferably from about 6 hours to about 24 hours, preferably from about 4 hours to about 24 hours, preferably from about 4 hour to about 8 hours.

Preferably, in step (e) the relative humidity is less than 100%, preferably wherein the relative humidity is between about 20% to about 100%, preferably from about 40% to about 90%, preferably about 50% to about 100%, preferably from about 50% to about 70%. Preferably, in step (e) the relative humidity is about 40% to about 80%. It is preferable that the relative humidity is less than 100%, and ideally lower to encourage the evaporation of water during the carbonation step. Preferably, excess water vapour is removed to reduce the relative humidity.

Preferably, in step (e), the temperature is in the range of about −5° C. to about 90° C., preferably in the range of about 5° C. to about 80° C. preferably in the range of about 5° C. to about 60° C., preferably in the range of about 10° C. to about 80° C. preferably in the range of about 20° C. to about 60° C., preferably in the range of about 10° C. to about 50° C. Such temperatures ensure that steam is not present and allow the carbonation reaction to progress effectively.

Preferably, the process is carried out at about 1 bar to about 2 bar. Preferably the process is carried out at substantially atmospheric pressure.

Preferably oxygen may be present during the process. This makes the process easier to manage as it is not necessary to exclude oxygen.

Preferably, the mixture has a pH from about 6 to about 14, preferably from about 7 to about 13, preferably from about 8 to about 13. Such pH values are advantageous as the resulting composite is less reactive than other composites.

Preferably, sulphur dioxide is present in step e). Sulphur dioxide is typically present in flue gases, and it is an advantage of the invention that it is not necessary to separate the sulphur dioxide from the flue gas. Further, sulphur dioxide may react with substituents in the mixture, particularly with sodium or potassium containing compounds to form sodium sulphite, sodium sulphate, potassium sulphite or potassium sulphate, or any combination of two or more of. This has the dual advantage of capturing sulphur dioxide and hardening the composite. Preferably, nitrous oxides and fine dusts from flue gas may also be present in step e) for analogous reasons.

Preferably the composite is a concrete composite.

Preferably, there is provided a process for producing a composite comprising:

a) providing a particulate material, wherein the particulate material comprises calcium oxide, calcium hydroxide or a calcium silicate, or any combination of two or more thereof, preferably blast furnace slag, metallurgy slag, Portland cement, Portland clinker, cement, air pollution control residue, bottom ash or fly ash or any combination of two or more thereof, preferably, steel slag, stainless steel slag, Portland cement, Portland clinker, cement, cement kiln dust, lime kiln dust, fly ash, and bottom ash or any combination of two or more thereof, preferably metal slag, preferably steel slag, preferably wherein the particulate material has a particle size of about 5 μm to about 500 μm, b) providing an aggregate, preferably a secondary aggregate, c) providing a primary additive, wherein the primary additive comprises a sugar or derivative thereof, a polyol or derivative thereof, an organic acid, an organic acid salt or an inorganic acid, or any combination of two or more thereof, preferably wherein the primary additive comprises a sugar or a derivative thereof, an organic acid or an inorganic acid or any combination of two or more thereof, preferably, glucose, lactic acid, calcium citrate, sodium citrate or sodium gluconate or any combination of two or more thereof, and optionally providing a further additive, wherein the further additive preferably comprises a plasticiser and/or calcium nitrate and/or sodium nitrate, d) mixing the particulate material, the aggregate, the primary additive, optional further additive and optional material of organic origin with water (preferably water with dissolved carbon dioxide) to form a mixture, preferably wherein the further additive is a plasticizer and e) carbonating the mixture in the presence of carbon dioxide, wherein the concentration of carbon dioxide is greater than about 2 vol %, from about to 2 vol % to about 100 vol %, preferably from about 5 vol % to about 90 vol %, preferably from about 7.5 vol % to about 80 vol %, preferably from about 10 vol % to about 70 vol %, preferably wherein the temperature between is between about 10° C. and about 60° C. and preferably wherein the carbonation occurs for between about 6 hours and about 24 hours Such a process is particularly useful for producing the composite of the invention.

Preferably, there is provided a process for producing a composite comprising:

a) providing a particulate material, wherein the particulate material comprises calcium oxide, magnesium oxide, calcium hydroxide, magnesium hydroxide, a calcium silicate, a magnesium silicate, a calcium aluminate silicate, a magnesium aluminate silicate, iron silicate, calcium aluminite, ferrite or any combination of two or more thereof, preferably steel slag, blast furnace slag, synthetic slag, metallurgy slags, Portland cement, Portland clinker, belite cement, belite, alite, calcinated clay, cement, air pollution control residue, bottom ash or fly ash, lime stone powder, dolomite powder or any combination of two or more thereof, wherein the particulate material has a particle size of about 5 μm to about 500 μm, b) providing an aggregate, preferably a secondary aggregate, c) providing a primary additive, wherein the primary additive comprises a sugar or derivative thereof, a polyol or derivative thereof, an organic acid, an organic acid salt or an inorganic acid, or any combination of two or more thereof, preferably wherein the primary additive comprises a sugar or a derivative thereof, an organic acid or an inorganic acid or any combination of two or more thereof, preferably, sucrose, glucose, lactic acid, calcium citrate, sodium citrate or sodium gluconate or any combination of two or more thereof, and optionally providing a further additive, wherein the further additive preferably comprises a plasticiser and/or calcium nitrate and/or sodium nitrate, d) mixing the particulate material, the aggregate, the primary additive, optional further additive and optional material of organic origin with water (preferably water with dissolved carbon dioxide) to form a mixture, preferably wherein the further additive is a plasticizer; and e) carbonating the mixture in the presence of carbon dioxide, wherein the concentration of carbon dioxide is greater than about 2 vol %, from about to 2 vol % to about 100 vol %, preferably from about 5 vol % to about 90 vol %, preferably from about 7.5 vol % to about 80 vol %, preferably from about 10 vol % to about 80 vol %, preferably wherein the temperature between is between about 5° C. and about 60° C., preferably wherein in the relative humidity is between about 40% and about 80%, and preferably wherein the carbonation occurs for between about 4 hours and about 24 hours Such a process is particularly useful for producing the composite of the invention.

The present invention relates to a composite produced by the process described herein.

Preferably, the composite is formed into any molded shape.

Preferably, the composite is substantially cuboidal.

Preferably, the composite is a precast product, preferably a panel, a paver, a block, a curb, a sewer, a briquette, or a slab.

Preferably, the composite is a panel, preferably a construction panel or a sandwich panel.

Such shapes have utility in the road and construction industry.

Preferably the composite has a height of about 1 cm to about 20 m, preferably about 1 cm to about 5 m and a length and a width each individually selected from about 1 cm to about 30 m, preferably about 1 cm to about 13 m. It is an advantage of the present invention that the composite can be directly formed into such a shape, such as for use as a paver or a panel.

Preferably the composite has a height of from about 1 cm to about 50 cm and a length and a width each individually selected from about 1 cm to about 3 m, preferably the composite has a height of about 5 cm to about 40 cm and a length and a width each individually selected from about 40 cm to about 80 cm. Such sizes are suitable for a paver, a black, a curb, a sewer, a briquette or a slab.

Preferably the composite has a height of from about 20 cm to about 5 m and a length of from about 1 m to about 13 m, and a width of from about 1 cm to about 50 cm. Such sizes are suitable for blocks and panels.

The composite of the present invention is preferably a solid product. This gives the composite the structural rigidity to be used in construction.

Preferably, the composite has a density from about 700 $kg/m^3$ to about 5000 $kg/m^3$, preferably from about 700 $kg/m^3$ to about 4000 $kg/m^3$, preferably from about 1500 $kg/m^3$ to about 3500 $kg/m^3$, preferably from about 1800 $kg/m^3$ to about 3000 $kg/m^3$, preferably from about 2000 $kg/m^3$ to about 3000 $kg/m^3$.

It is an advantage of the process of the present invention that the resulting composite has a greater density than conventional cement construction materials. This makes the resulting composite well suited for applications that require shielding against or absorbing radiation, or where a high structural strength is required at high temperatures. It is also an advantage of the process of the present invention that the resulting composite with a greater density, also has a lower, finer porosity than conventional concrete materials. Preferably the pore size is less than about 100 μm, preferably less than about 10 μm. This finer porosity gives the material an improved resistance to chemicals and restricts the access of chemicals that may weaken, shrink or crack the material from penetrating far in. Applications that are in corrosive environments, such as de-icing salt, heat, frost and seawater are therefore well suited for using this composite with finer porosity.

It is also an advantage of the process of the present invention that the resulting composite has increased durability over conventional cement construction materials. Without wishing to be constrained by theory it is believed to be due to the greater extent of distribution of a carbonate matrix within the material.

Preferably, the composite has a free water content of about 0 wt % to about 30 wt %, preferably about 1 wt % to about 20 wt %, more preferably about 5 wt % to about 15 wt %. It is not necessary to remove all the free water in the composite, prior to using it as a building material Preferably, the composite has a pH from about 6 to about 14, preferably from about 7 to about 13, preferably from about 8 to about 12, preferably from about 8 to about 11. Such pH values are advantageous as the composite is less reactive than other composites.

The present invention relates to use of a composite as described herein, as a construction/building material, preferably a building material.

Preferably, the present invention relates to a composite as described herein used as a prefabricated construction material.

It is an advantage of the composite of the present invention that it can be molded to any required shape and size for which it might be needed, allowing it to be easily used in a wide variety of different construction projects.

EXAMPLES

Example 1

A composite was formed by mixing 450 g ground steel slag (0 to 90 μm), 1350 g aggregate (sand 0 to 5 mm), 160 to 180 ml water and an optional primary additive. Table 1 shows the amounts of the primary additive used in each composite, as a percentage of the particulate content. The mixture was cast into cylindrical mold and pressure applied to form a cylindrical sample with a height of about 3.5 cm and a diameter of about 6 cm. The samples were then cured for 8 hours with 80% $CO_2$, at 30° C., 60 to 80% relative humidity. The compressive strength of each sample was then measured with a compressive strength device machine according to EN196.1—2016. The compressive strength was measured for three cylindrical samples for each example shown below. The compressive strength is shown in Table 1. The standard deviation was +/−2-3 MPa showing a slight deviation between samples, however the values between the samples with and without additives show a clear difference in compressive strength.

Figure 1:
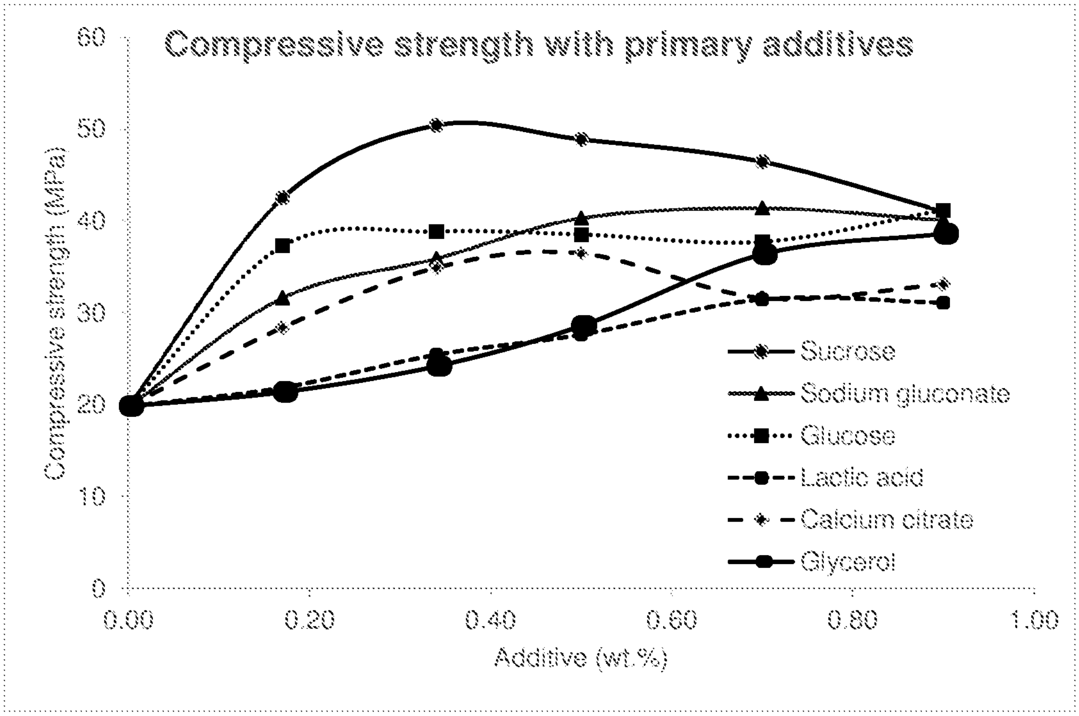
FIG. 1 shows the compressive strength of a composite with different primary additives.
Figure 2:
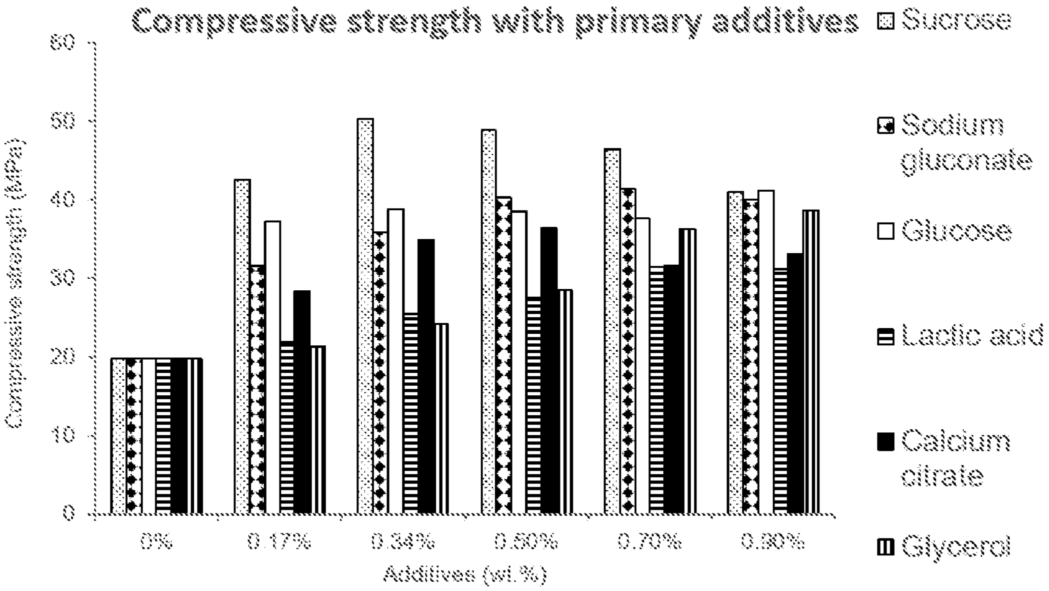
FIG. 2 shows the compressive strength of a composite with different primary additives.

As shown in the results in Table 1 and FIGS. 1 and 2, the compressive strength of the composite increased by using a primary additive. The results show a particularly high increase in compressive strength when glucose, sucrose and sodium gluconate are used as the primary additive as the compressive strength more than doubles (over 40 MPa) compared to no primary additive being used (20 MPa). Further using glycerol nearly doubles the compressive strength. Calcium citrate and lactic acid also show an increase in compressive strength, with the calcium citrate showing a larger increase than lactic acid. It is believed that the increase in compressive strength for composites of the invention increases the chemical resistance of the composite. The data shows some of the technical advantages of the invention.

TABLE 1

| Additive wt % additive | Sucrose | Sodium gluconate | Glucose | Lactic acid | Calcium citrate | Glycerol |
|---|---|---|---|---|---|---|
| | Compressive Strength MPa | | | | | |
| 0 | 20 | 20 | 20 | 20 | 20 | 20 |
| 0.17 | 42 | 32 | 37 | 22 | 28 | 21 |
| 0.34 | 50 | 36 | 39 | 25 | 35 | 24 |
| 0.5 | 49 | 40 | 39 | 28 | 36 | 29 |
| 0.7 | 46 | 41 | 38 | 31 | 32 | 36 |
| 0.9 | 41 | 40 | 41 | 31 | 33 | 39 |

Example 2

A composite was formed as set out for Example 1, except a proportion of the ground steel slag was replaced with cement (CEM 52.5R) as shown in Table 2. In these composites, the primary additive was sodium gluconate and the amount is shown in Table 2. The standard deviation was +/−2-3 MPa showing a slight deviation between samples, however the values between the samples with and without additives show a clear difference in compressive strength.

TABLE 2

| Amount of ground steel slag replaced with CEM 52.5R | Amount of Sodium gluconate wt % | Compressive Strength MPa |
|---|---|---|
| REF (0% CEM) | 0 | 23 |
| 5% CEM | 0 | 23 |
| 10% CEM | 0 | 25 |
| 20% CEM | 0 | 30 |
| REF (0% CEM) | 0.5 | 42 |
| 5% CEM | 0.5 | 52 |
| 10% CEM | 0.5 | 58 |
| 20% CEM | 0.5 | 59 |

Figure 3:
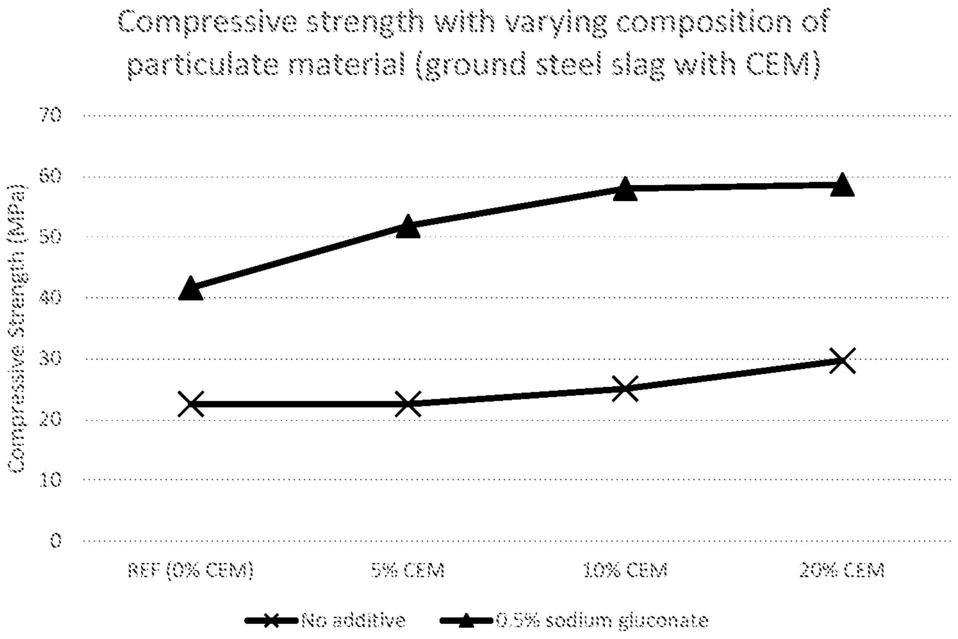
FIG. 3 shows the compressive strength of a composite with different compositions of particulate materials.

As shown in the results in Table 2 and FIG. 3, the compressive strength of the composite still increased by using an additive when the composition of the particulate material is changed. It is believed that the increase in compressive strength for composites of the invention increases the chemical resistance of the composite. The data shows some of the technical advantages of the invention.

Within this specification, the term derivative preferably refers to a chemical compound or molecule made from a parent compound by one or more chemical reactions, and having a substantially similar chemical structure, or a salt thereof, preferably by any of carboxylation, oxidation, amination, reductive amination or chlorination. Preferably, the term derivative means (i) the product of incorporating one or more of a carboxylic acid, amine, sulfonic acid or sulfuric ester functional group into a parent compound, or a salt thereof, preferably for one or more of a carboxylic acid or amine, or a salt thereof, preferably for one or more carboxylic acid or a salt thereof, and/or (ii) the product of hydrogenation of a parent compound, or a salt thereof. Preferably the salt is a sodium salt or a calcium salt It will be appreciated that air pollution control residue has a known meaning in the art and is a by-product of industry. Air pollution control residue is typically a mixture of ash, carbon and lime. It may comprise further components.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein and vice versa.

Within this specification, the term "about" means plus or minus 20%, more preferably plus or minus 10%, even more preferably plus or minus 5%, most preferably plus or minus 2%.

Within this specification, the term "substantially" means a deviation of plus or minus 20%, more preferably plus or minus 10%, even more preferably plus or minus 5%, most preferably plus or minus 2%.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications are covered by the appended claims.

The invention claimed is:

1. A process for producing a concrete composite comprising:

a. providing a particulate material, wherein the particulate material comprises minerals having a content of at least 30% m/m of calcium, magnesium, aluminium, silicon, potassium, or iron, or a combination of two or more thereof, b. providing an aggregate, c. providing a primary additive, wherein the primary additive comprises a sugar or derivative thereof, a polyol or derivative thereof, an organic acid comprising a carboxylic acid, or an organic acid salt comprising a carboxylate salt, or any combination of two or more thereof, wherein the carboxylic acid containing compound or carboxylate salt containing compound comprises citric acid, sodium gluconate, sodium citrate, calcium citrate, acetic acid, sodium acetate, calcium acetate, formic acid, glyceric acid, ascorbic acid, tartaric acid, oxalic acid, malic acid or lactic acid, or any combination of two or more thereof, wherein the primary additive is provided in the form of a solution, a colloidal suspension, or a powder, d. mixing the particulate material, the aggregate, and the primary additive with water to form a mixture, wherein the primary additive forms metal ion complexes in the mixture to more uniformly distribute metal ions throughout the mixture, wherein the process comprises removing water from the mixture, wherein the mixture is shaped using a mold or a support, wherein the mixture remains in the mold or on the support for a period of from 1 s to 2 hours and is then separated from the mold or the support prior to carbonating the mixture, and e. carbonating the mixture in the presence of carbon dioxide for a period of from 1 hour to 48 hours, wherein a concentration of carbon dioxide is greater than about 2 vol %, wherein the metal ions form a substantially uniform carbonate matrix in the concrete composite.

2. A process according to claim 1, wherein the particulate material is selected from the group consisting of blast furnace slag, meta kaolin, calcinated clay, olivine, serpentine, Portland cement, cement by-pass dust, lime kiln dust, cement kiln dust, air pollution control residue, Portland clinker, cement, limestone powder, quicklime, rock fines, concrete fines, mine tailings, fly ash, bottom ash, biomass ash, metallurgy slag, red mud, paper ash, dusts, oil shale ash, metal silicate powder, metal hydroxide powder, calcium sulphate, pozzolanic material or bleaching earth material, or any combination of two or more thereof.

3. A process according to claim 1, wherein the particulate material has an average particle size of less than about 1 mm.

4. A process according to claim 1, wherein the aggregate has an average particle size of about 1 mm to about 90 mm.

5. A process according to claim 1, wherein the primary additive is selected from the group consisting of a sugar or derivative thereof, a polyol or derivative thereof, an organic acid, or an organic acid salt or any combination of two or more thereof.

6. A process according to claim 1, wherein the mixture comprises about 0.001 wt % to about 10 wt % of the primary additive as a percentage of the particulate material.

7. A composite produced by the process according to claim 1.

8. A process according to claim 1, wherein the primary additive is selected from the group consisting of sucrose, sodium gluconate, glucose, lactic acid, calcium citrate or glycerol, or a combination of two or more thereof.

9. A process according to claim 1, comprising providing a further additive, wherein the further additive comprises a plasticizer.

10. A process according to claim 1, wherein the water is removed from the mixture at a temperature of about 20° C. to about 70° C.

11. A process according to claim 1, wherein the mixture is carbonated in the presence of a gas comprising carbon dioxide concentration from about 10 vol % to 100 vol %.

12. A process according to claim 1, wherein the relative humidity is between 20% and 80% for carbonating the mixture.

13. A process according to claim 1, wherein the period for carbonating the mixture is from about 4 hours to about 36 hours.

14. A process according to claim 1, wherein the temperature is in a range of 10° C. to 80° C. for carbonating the mixture.

15. A process according to claim 1, wherein carbonating the mixture comprises providing carbon dioxide, wherein the carbon dioxide does not comprise steam.

16. The process according to claim 1, wherein the concrete composite comprises at least some free water.

17. The process according to claim 1, further comprising washing the particulate material to remove impurities.

18. The process according to claim 17, wherein washing the particulate material begins curing of the particulate material.

* * * * *